United States Patent [19]

O'Boyle et al.

[11] 4,217,403

[45] Aug. 12, 1980

[54] LITHIUM HALIDE BATTERY

[75] Inventors: Matthew O'Boyle, Cockeysville; Alan A. Schneider, Reisterstown; Ross E. Magladry, Baltimore, all of Md.

[73] Assignee: Catalyst Research Corporation, Baltimore, Md.

[21] Appl. No.: 896,639

[22] Filed: Apr. 17, 1978

[51] Int. Cl.² ............................................. H01M 6/18
[52] U.S. Cl. ................................. 429/162; 429/178; 429/213; 429/218
[58] Field of Search ............... 429/101, 162, 174, 178, 429/181, 185, 199, 213, 218, 121–123, 163

[56] References Cited

U.S. PATENT DOCUMENTS

| | | | |
|---|---|---|---|
| 3,660,163 | 5/1972 | Moser | 429/213 X |
| 3,723,183 | 3/1973 | Greatbatch | 429/191 X |
| 3,817,791 | 6/1974 | Greatbatch et al. | 429/181 X |
| 3,874,929 | 4/1975 | Greatbatch | 429/181 X |
| 3,957,533 | 5/1976 | Mead et al. | 429/213 |

Primary Examiner—Anthony Skapars
Attorney, Agent, or Firm—Reed, Smith, Shaw and McClay

[57] ABSTRACT

A lithium halide battery appropriate for low-cost, mass production is disclosed in which the battery comprises an outer encasement member having top and bottom portions and an opening through one with at least one pelletized depolarizer positioned within the encasement member and in electrical contact therewith. The battery includes a lithium anode in contact with the depolarizer but electrically separated from the encasement member. At least one insulator means is positioned in contact with the anode and includes an opening therethrough located to align with the opening in the encasement. A terminal pin is positioned through the opening in the encasement member, but insulated from the periphery thereof, and in electrical contact with the anode through the opening in the insulator means.

6 Claims, 3 Drawing Figures

LITHIUM HALIDE BATTERY

BACKGROUND OF THE INVENTION

Lithium batteries and, in particular, lithium halide batteries are old and well known, see e.g., U.S. Pat. Nos. 3,660,163 3,660,164, 3,674,562, 3,937,635, 4,049,890 and 4,072,803. Numerous types of enclosures have been used for commercial embodiments of batteries to achieve various objects, but most often to obtain the maximum battery capacity, long-life and high power density.

The object of the present invention is to provide not only the traditional objectives but to provide a battery which is susceptible to mass production and lower manufacturing costs. Additionally, it is an object to provide a battery which is reliable and which is particularly well suited for use in electrical watch applications, as well as hearing aid and heart pacer applications.

SUMMARY OF THE INVENTION

Generally, the lithium halide battery of the present invention includes an outer encasement member having a top and base portion. Preferably, the encasement member is made of stainless steel or nickel and includes an opening therethrough positioned in either the base or top portion of the encasement. The base portion most preferably comprises a cup shaped configuration having a concentrical inner flange about the periphery to receive the top portion. Positioned within the base portion is at least one depolarizer pellet preferably of a charge transfer material and halogen. The pellet is positioned in the base member and in electrical contact therewith. Positioned adjacent to and in contact with the depolarizer pellet is a lithium anode preferably having substantially the same configuration as the depolarizer pellet and base member. The lithium anode, however, is dimensioned so as to be slightly smaller than the depolarizer pellet and base portion of the encasement member to avoid electrical contact with the sides of the base member.

Positioned adjacent to and in contact with the lithium anode is an insulating member preferably comprising Halar ® or any suitable insulator material. The insulating member includes an opening therethrough alignable with the opening in the encasement member. In one embodiment, the insulating member is positioned over the entire surface of the lithium anode to insulate said anode from the top portion of the encasement member. In another embodiment, however, a pair of depolarizer pellets are used wherein the lithium anode is sandwiched therebetween and the insulator means are positioned in slots formed in the depolarizer pellets. In that embodiment, only one of the insulator means includes an opening therethrough.

The battery includes a terminal pin which extends through the opening in the encasement member, but electrically isolated from the periphery of the opening, preferably by a glass seal. The terminal pin is in electrical contact with the lithium anode through the associated opening in the insulator member. The top portion is welded to the base portion to hermetically encapsulate the pelletized depolarizer and the lithium anode.

While the configurations of the cell are discretionary, it has been found that the flat cylindrical cells provides good capacity, and a high area to volume ratio, particularly for watch or hearing aid usage. The battery of the present invention is described herein in its unipolar form, since that form facilitates mass production through the elimination of components and steps. However, by electrically insulating the depolarizer pellet from the encasement member and including an additional terminal pin which is placed in contact with the pellet, a bipolar battery can be made in accordance with the present invention. The present invention eliminates the need for a cathode current collector as well as redundant internal sealing because of the use of the preferred depolarizer pellet. Other advantages of the present invention will become apparent from a perusal of the following detailed description of presently preferred embodiments taken in connection with the accompanying drawings and a description of the current best mode of assembly.

DETAILED DESCRIPTION

Figure 1:
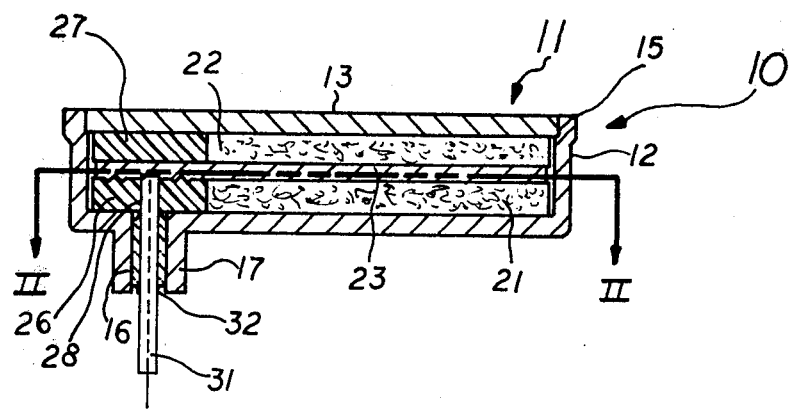
FIG. 1 is a sectional elevation taken along line I—I of FIG. 2.
Figure 2:
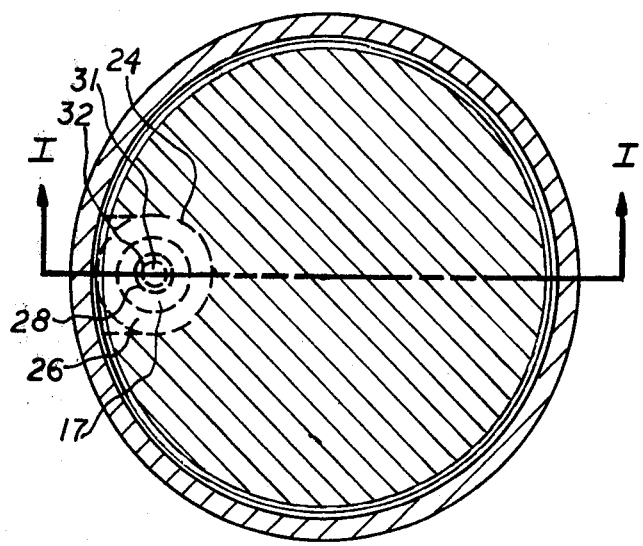
FIG. 2 is a sectional plan view taken along line II—II of FIG. 1.

With reference to FIGS. 1 and 2, lithium halide battery 10 comprises an encasement means 11 consisting of base portion 12 and top portion 13. Encasement means 11 is preferably made of 304 stainless steel and is preferably shaped in the form of a flat cylinder to provide a desirably high area to volume ratio. Base portion 12 is provided with opening 16 around the periphery of which is positioned annular flange 17.

Positioned within base portion 12 is first depolarizer pellet 21, a second depolarizer pellet 22 and lithium anode disc 23 positioned between first and second depolarizer pellets 21 and 22, respectively. The depolarizer pellets 21 and 22 are pressure molded to include slot opening 24, FIG. 2. Slots 24 are positioned to align with opening 16 in encasement 11. Positioned within each slot is circular insulator means 26 and 27, respectively. Insulator means 26 includes an opening 28 also located to align with opening 16 in encasement means 11.

A terminal pin 31 is positioned through opening 16 in encasement member 11 and opening 28 in insulator 26. Electrically separating terminal pin 31 from outwardly extending flange 17 is glass seal 32. While it is clear that battery 10 could be manufactured with only one insulator means 26, it may be preferable from the standpoint of the ease of manufacturing to make all depolarizer discs with slot 24 in one assembly. Also, it is advantageous in some circumstances to have an additional insulator 27 to provide support behind terminal pin 31 to prevent pin 31 from contacting pellet 22 through member 23. Since lithium anode member is from about 0.007" to 0.015" and preferably 0.011" in thickness, it is possible for pin 31 to penetrate through lithium disc anode 23. In such a case, the battery would short circuit if depolarizer pellet 22 did not include insulator means 27.

The connection between the negative terminal and the lithium anode is preferably a metallic bond which is achieved by applying pressure between the anode and terminal and reciprocating the anode material at a frequency of 20,000 Hz and an amplitude of 0.004" for 0.2 seconds. This same reciprocating pressure also bonds insulator 26 to lithium member 23 insuring that no halogen vapor can penetrate the interface between the insulator and lithium member and cause unwanted corrosion.

Encasement means 11 is dimensioned so that expansion in the depolarizer pellets provide intimate contact between the upper and lower cathode surfaces and encasement intersurfaces. The volumetric ratio of cathode to anode is 2.75:1 to 4:1 and preferably 2.8:1 to 3.2:1 which insures that both component materials are exhausted at the end of life of the cell, thus providing maximum cell capacity within a given volume. Top portion 13 of encasement means 11 is designed with an interference fit of 0.0002" so that when the cell is assembled prior to welding the assembly is under pressure. Top portion 13 is welded to base 12 preferably by rotating base 12 in a water cooled fixture held at approximately 40° F. During welding, as the temperature of encasement 11 increases, the expansion of top portion 13 confined within base 12 and the resulting stress cause the top portion to deflect in a slightly concave manner applying pressure to the internal components and absorbing any negative manufacturing tolerances.

The best mode presently contemplated for the manufacture of battery 10 comprises positioning base portion 12 with terminal pin 31 held rigidly in position by glass seal 32 in an engaging fixture. First insulator 26 is positioned concentrically over terminal pin 31 and first depolarizer 21 is placed in base 12 such that first insulator 26 is located within slot 24 of depolarizer 21. Lithium anode 23 is positioned against depolarizer pellet 21, insulator means 26 and terminal pin 31.

During assembly, a plastic film oversheet is temporarily positioned on anode 23 opposite from terminal pin 31. An ultrasonic welding tip is applied to the plastic oversheet to effect the bond described above. After welding, the oversheet is removed and the second depolarizer pellet 22 and insulator 27 are positioned so that slot 24 of pellet 22 encircles insulator 27 and is opposite from terminal pin 31. Top portion 13 with its interference fit is pressed into flange 15 to hold the entire assembly in compression prior to welding which is derived as set forth above.

Figure 3:
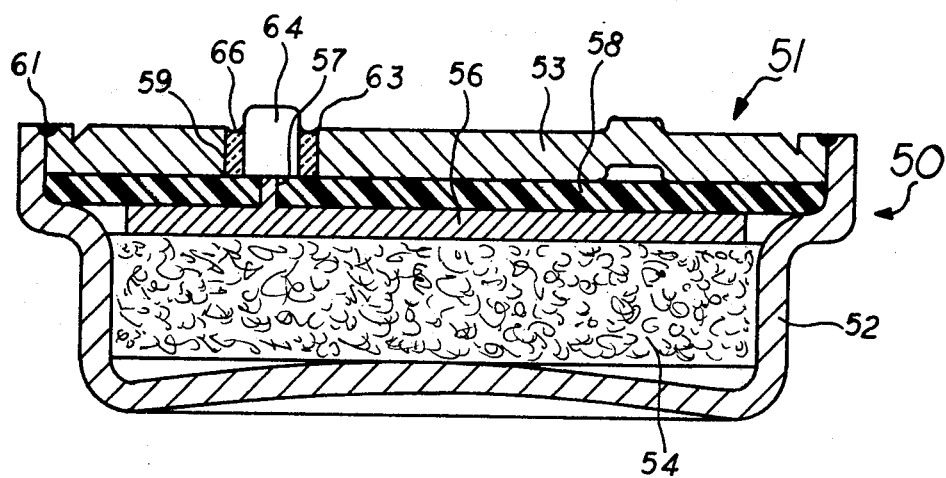
FIG. 3 is a sectional elevation of another embodiment of the present invention.

With respect to FIG. 3, battery 50 is shown including an encasement member 51 having a base portion 52 and a top portion 53. Battery 50 also includes a depolarizer pellet 54 and lithium anode disc 56 and terminal pin 64 electrically connected to anode disc 56. Lithium anode disc 56 is electrically insulated from top portion 53 by insulating means 58 having an opening 59 therethrough. Top portion 53 includes an opening 63 through which terminal pin 64 passes. A glass seal 66 insulates terminal pin 64 from top portion 53.

The best mode presently contemplated for the manufacture of battery 50 comprises positioning terminal pin 64 in opening 63 of top portion 53 by means of glass seal 66. Top portion 53 is positioned upside down and insulating means 58 is positioned on the underside of top portion 53 such that opening 59 in insulator 58 is concentrically aligned over terminal pin 64.

Lithium anode 56, preferably having a thickness of about 0.011" or up to 0.040" for high capacity cells is placed against insulator 58 such that electrical contact between anode 56 and encasement 51 is avoided. Electrical contact between anode 56 and terminal pin 64 is accomplished by extruding anode 56 into opening 59 to form contact 57. A metallic bond is then effected between anode contact 57 and terminal pin 64 by resistance spot welding. Alternatively, a terminal pin may be provided as described with reference to battery 10 as shown in FIG. 1.

Adjacent to anode 56 is positioned depolarizer pellet 54. Base portion 52 is then fitted over top portion 53 and hermetically sealed by weld 61.

In this embodiment, the concave deflection of the encasement, noted with respect to battery 10 does not occur because of geometrical differences between the two batteries. Accordingly, if such a deflection is desired, base portion 52 includes a spring depression as shown in FIG. 3.

Preferably, the depolarizer pellet comprises a pelletized particulate mixture of an organic polymer consisting of either poly-2-vinylquinoline or poly-2-vinylpyridine, a charge transfer complex consisting of the selected organic polymer and iodine, and iodine, where the iodine is present in an amount of from 3 to 30 parts of total organic, and preferably, from 15 parts to 26 parts of total organic. The complete description of the depolarizer pellet and method for making same are set forth in patent application Ser. No. 892,655 [Docket No. 76-114], filed Apr. 3, 1978, and assigned to the assignee of the present invention, and incorporated herein by reference.

While presently preferred embodiments of the invention have been shown and described in detail, it may be otherwise embodied within the scope of the appended claims.

What is claimed is:

1. A lithium battery comprising:
   a. an outer encasement member having a base portion and a top portion adapted to assert pressure on a depolarizer pellet and anode, said encasement member having at least one opening therethrough;
   b. at least one depolarizer pellet positioned within and in electrical contact with the encasement member;
   c. a lithium anode in pressure contact with the depolarizer pellet and electrically spaced apart from the encasement member;
   d. at least one insulator means in contact with at least a portion of the anode and having an opening therethrough aligned with the opening in the encasement member; and
   e. a terminal pin positioned through said opening in the encasement member and electrically isolated therefrom and in electrical contact with the anode through said opening in the insulator means.

2. A lithium battery as set forth in claim 1 including a second depolarizer pellet positioned between said lithium anode and the top portion of the encasement means.

3. A lithium battery as set forth in claim 2 including a second insulator means wherein each of said depolarizer pellets include slots aligned with the opening in the encasement and each of said insulator means are positioned within said slots and the opening in the first insulator means is aligned with the opening in said encasement means.

4. A lithium battery as set forth in claim 1 wherein said lithium anode includes an electrical contact extending through said opening in the insulator means and wherein said insulator means is positioned between said anode and top portion to insulate said lithium anode therefrom.

5. A lithium battery as set forth in claim 1 wherein said encasement member includes a second opening and including a second insulator insulating said depolarizer pellet from said encasement member having an opening aligned with said second opening in the encasement member and a second terminal pin in electrical contact with only said depolarizer pellet and positioned through the opening in said second insulator and second opening in the encasement member.

6. A lithium battery as set forth in claim 1 wherein said encasement member includes baising means to assert a pressure on said depolarizer pellet and said anode.

* * * * *